Dec. 16, 1952     C. D. PETERSON     2,621,400
REPAIR RACK FOR DOMESTIC GAS SERVICE METERS
Filed July 12, 1948     2 SHEETS—SHEET 1
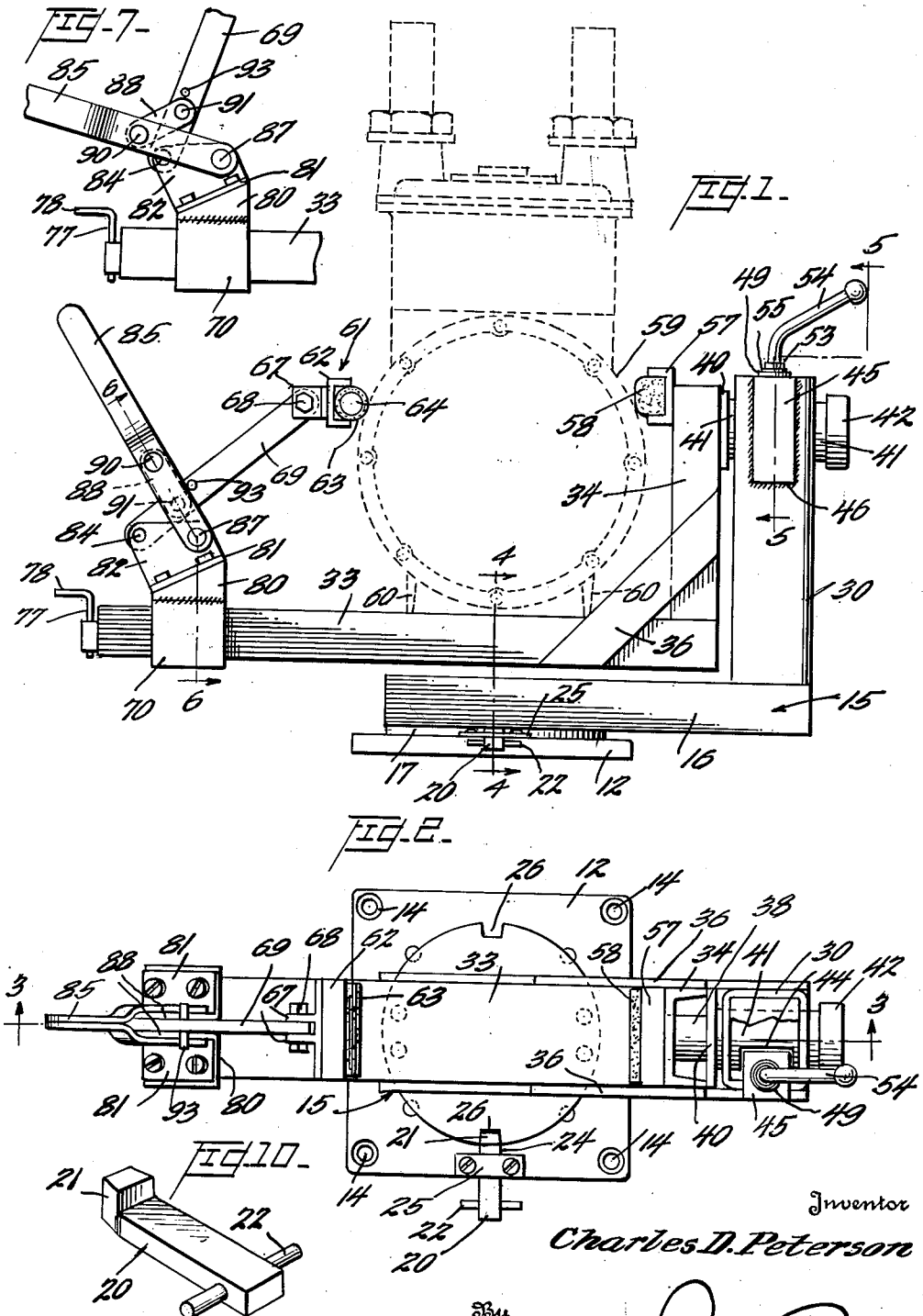
Inventor
Charles D. Peterson
By
Leech & Radue
Attorneys

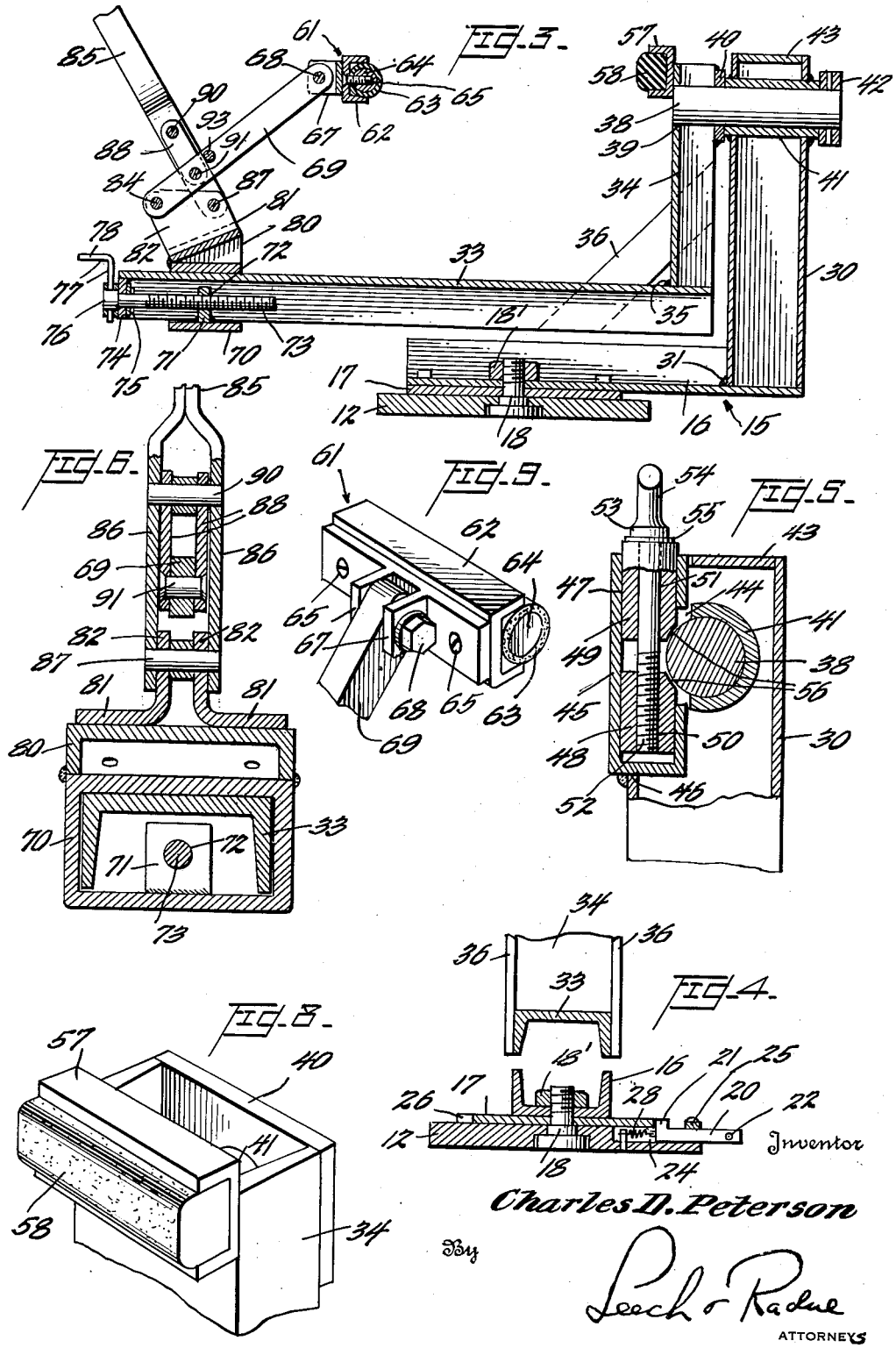

Patented Dec. 16, 1952

2,621,400

UNITED STATES PATENT OFFICE 2,621,400

REPAIR RACK FOR DOMESTIC GAS SERVICE METERS

Charles D. Peterson, Dallas, Tex., assignor to Universal Controls Corporation, Dallas, Tex., a corporation of Texas Application July 12, 1948, Serial No. 38,334

2 Claims. (Cl. 29—284)

This invention relates to meter repair racks, and more particularly to such racks for use in holding and positioning domestic service gas meters and adapted to present them for maintenance and repair at any desired angle about vertical and horizontal axes for added convenience in servicing.

It is a general object of the present invention to provide a novel and improved universal gas meter repair rack.

More particularly it is an object of the invention to provide, in a universal gas meter repair rack, a novel construction permitting the mounting of meters of various sizes and shapes with great facility and embodying simplified features of assembly and construction whereby the meter may be adjusted about both the vertical and horizontal axes and readily clamped in adjusted position.

One of the important features of the invention comprises the assembly of a universal meter repair rack largely from conventional standardized structural parts.

Other important objects and features of the invention will be more apparent to those skilled in the art upon a consideration of the accompanying drawings and following specification, wherein is disclosed a single exemplary embodiment of the invention, with the understanding that such changes may be made therein as fall within the scope of the appended claims without departing from the spirit of the invention.

In said drawings:

Fig. 1 is a side elevation of a repair rack for domestic service gas meters constructed in accordance with the present invention and illustrated with a typical meter in position;

Fig. 2 is a top plan view thereof with the meter removed;

Fig. 3 is a longitudinal vertical section taken on line 3—3 of Fig. 2 and illustrating constructional details;

Fig. 4 is a transverse vertical section taken on line 4—4 of Fig. 1, illustrating the pivotal mounting of the main frame on the base;

Fig. 5 is a fragmentary transverse vertical section taken on line 5—5 of Fig. 1 and illustrating the clamping means for the axis of the meter cradle;

Fig. 6 is a fragmentary transverse section taken on broken line 6—6 of Fig. 1, showing the arrangement of the toggle clamping mechanism;

Fig. 7 is a fragmentary elevation of the toggle clamping mechanism showing it in the open position;

Figs. 8 and 9 are respectively perspective views of the stationary and movable heads and the resilient cushions thereon used for clamping a meter in position; and Fig. 10 is a perspective view of the locking element used to retain the main frame in desired oriented position.

Gas meters for domestic gas service are generally of two distinct types. The older and more common form in many communities is the so-called "tin" meter in which the case or housing is formed of thin sheet metal of a generally rectangular plan and elevation. The second general type, and one becoming more and more popular, particularly for out-door installation, is the cast iron meter having a heavy housing of varying configuration and often including a horizontally disposed cylindrical portion and a generally rectangular top portion. The so-called "tin" meter is relatively light in weight and is completely sealed up by soldering or the like and requires different treatment and service operations for its testing and repair. The much heavier cast iron gas meter has removable cover plates permitting access to the whole interior. Because of its odd shape it will not lie steady and present the desired areas for working when merely thrown on to a bench. The present invention provides a rack for mounting and supporting such cast iron gas meters by engagement with fixed portions of the casing, permitting removal of the cover plates for access to the interior for service and repair. For convenience in working on the meter the rack is rotatable about a vertical axis and can be clamped in several positions when so adjusted. It is provided with a cradle adjustable about a horizontal axis to present the meter in the most convenient attitude for performing various service operations. It is continuously adjustable on this axis and can be clamped in any position within its range.

The repair rack of the present invention is simply constructed by welding together conventional structural shapes to form the basic frame and cradle.

Referring to the drawings for a better understanding of the invention, it will be seen that the rack is built up about a flat base plate 12 of suitable shape and provided with openings 14 whereby it may be attached to a pipe stand or bench to provide a rigid mounting. Attached to this base plate for rotation about a central vertical axis therethrough is the main frame 15, of generally L-shape, having the horizontal member 16 formed from a section of channel iron with the web down. The web at one end of this channel is suitably secured to a flat metal disk 17 of less diameter than the width of plate 12. As seen in Fig. 4 the plate 12 is centrally perforated and countersunk beneath to receive the shank and head respectively of a king bolt 18. The disk 17 and the portion of the channel 16 above it is drilled to receive the shank of the king bolt and a nut or other fastening 18' received on the bolt holds the parts together and permits guided rotation of frame 15 on a vertical axis. To provide for maintaining adjustment there is a suitable lock nut or other convenient means. The preferred arrangement comprises a locking element 20, shown enlarged in Fig. 10, including a shank of rectangular cross-section, a tapered upwardly projecting end lug 21 and a transverse pin 22 at the outer end. This locking key is slidable in a radial groove 24 in base plate 12 of the depth of the shank so that a flat holding plate 25 may be used to position it and to limit its withdrawal by engagement of the back face of lug 21 therewith. Any desired number of notches 26, here shown as two, are provided in disk 17 for receiving the tapered end of lug 21 for locking the frame. Notches 26 are slightly narrower than the maximum width of the tapered lug to insure against looseness when the locking lug is drawn home by means of tension spring 28 (Fig. 4) stretched between a pin in the floor of recess 24 and one on lug 21.

The vertical portion of L-frame 15 comprises a square tube 30, dimensioned to fit between the flanges of channel 16 at their edges. It is so cut and bent at its lower end as to closely fit between the flanges and against the web, where it is welded to provide a rigid structure. One of the welds is seen at 31 in Fig. 3.

The meter supporting cradle is likewise of L-shape, having a horizontal member 33 formed from an inverted channel and a normally vertical end member 34 also a channel which abuts the web of channel 33 at one end and is welded thereto, as shown at 35. A pair of gusset plates or diagonal reinforcing members 36 are appropriately welded across the corner of the cradle to insure adequate strength.

The short section 38 of cylindrical steel shafting passes through opening 39 in the web of channel 34 near its upper end and also through plate 40 welded transversely across the open outer face of the channel and is welded to the metal surrounding both of these holes. This shaft 38 has a horizontal axis and is received in a close fitting bearing sleeve 41, passing through holes of the inner and outer members of square tube 30 and welded therein. It extends slightly beyond the two faces of the tube to provide clearance on the one side for rotation of the cradle and on the other for collar 42 pinned to the end of shaft 38 to limit longitudinal movement thereof. If desired a cover plate 43 may be welded on the end of tube 30.

As seen in Figs. 2 and 5, bearing sleeve 41 has a segment, intermediate its ends, cut away as at 44 to receive the locking means for holding the cradle in adjusted position. This locking means is of the quill type and includes a section of square rod 45 set into a close fitting cutout 46 in the front wall of tube 30, where it is welded as seen in Fig. 5. This rod is cut away to clear the shaft 38 where it projects through opening 44 in the bearing sleeve. Rod 45 is vertically centrally drilled with a circular opening 47 in which are slidably received the two locking blocks 48 and 49. These are merely portions of circular shaft, the lower one being vertically drilled and threaded as at 50 to engage the threaded lower end of locking screw 52 while the upper one has a central bore 51 providing a loose sliding fit for the shank of the locking screw. This screw has an integral collar 53 thereon and a suitable bent-over handle 54 for manipulation. The collar bears on washer 55 at the top of the upper block. The screw 52 clears shaft 38 and the locking blocks 48 and 49 are chamfered at 56 for engagement with shaft 38 when they are drawn together by tightening the screw 52.

A short section of small channel 57 is secured against the upper end of web of cradle channel 34. A resilient block 58 of rubber or the like has a portion received in the channel and protrudes sufficiently to engage the portion 59 of the meter, shown in dotted lines in position in the cradle. The feet or rails 60 customarily provided on these meters rest on the channel 33 at the bottom of the cradle.

For the purpose of engaging a third or fourth position on the cylindrical case of the meter to rigidly position it on the cradle, a clamping member 61 such as shown in Figs. 3 and 9, is provided. The construction here shown can also be used in lieu of the stationary clamp 58 and comprises a short channel section 62 closely receiving a length of heavy rubber tubing 63, filled by rod 64 and the whole held together by screws 65 passing through the channel web and received in the rod. Such channel is provided with a pair of parallel wings 67 horizontally drilled to receive bolt 68 which passes through an aperture at the upper end of lever 69, forming a part of a clamping mechanism which will now be described.

A box-like sleeve 70, best seen in Figs. 3 and 6, has a sliding fit over lower element 33 of the cradle. It has welded on its lower member a tab 71, centrally drilled and threaded at 72 to receive adjusting screw 73, the shank end of which passes through a block 74 welded in the end of channel 33 and drilled for a bearing fit for this shank. A pin 75 engages the inner face of block 74 and positions the screw longitudinally when cooperating with the head 76 on the outer end of the screw through which is conveniently passed a rod 77 bent over at 78 to form a crank handle. All of this outer assembly may be replaced by a hand wheel if desired. It will be seen that by rotation of crank 78 the sleeve may be adjusted toward and from the end of channel 33 whereby the resilient clamping assembly 62, 63, is positioned to accommodate various meters.

A wedge-like member 80, formed of bent metal plate, is welded to the upper face of sleeve 70 and provides a top surface inclined away from the meter, to which are secured angle members 81 providing spaced ears 82 between which lever arm 69 is pivoted at 84.

An operating lever or handle 85 is formed from a folded metal strap having its parts contiguous at the upper end and splayed below to provide spaced portions 86 which straddle ears 82 and are pivoted thereto at 87 on an axis parallel to 84 and closer to the meter.

Operating lever 85 and clamping lever 69 cross and are connected by intermediate link 88, comprising spaced parts best seen in Fig. 6, pivoted at 90 to lever 85, between the two parts of which they fit, and at 91 to lever 69 over which they straddle. The released position of locking lever 69 is shown in Fig. 7 where it extends almost vertically from its pivot on the slide 70 while the operating lever 85 is almost horizontal. As the operating lever is lifted the clamping lever 69 is forced downwardly but an angle of substantially 90° still remains between them.

Because the levers cross just above their pivots and because of the location of these pivots and those for link 88, this link eventually rotates to a position coincident with lever 85, as seen in Fig. 1. Here lever 85 is brought to a stop against pin 93 in lever 69. This whole arrangement will be understood as having a toggle action, for as the handle 85 moves toward the position shown in Fig. 1 the angularity between it and the link 88 becomes extremely small and a substantial angular movement of 85 results in only slight movement of lever 69, whereby great force can be applied by lever 69 with but little applied to the operating handle 85. If handle 85 is permitted, by the positioning of pin 93, to move slightly beyond the position where pivots 87, 90 and 91 come into alignment, the system is self-locking and will remain positioned until counterclockwise torque is applied to lever 85. Slide 70 must be adjusted on the lower element of the cradle to properly position the clamp member 63 so that it will assume the desired clamping pressure when brought to the position of Figs. 1 and 3, and thereafter similar meters can be clamped by operating only 85. When in the unlocked position of Fig. 7 liberal spacing between the two clamping members is provided to permit vertical insertion of the meter between them should this be desired.

After the meter is locked in position the main frame may be rotated by withdrawing the locking key and swinging the frame to the desired position and locked by releasing the key to engage in one of the notches 26. Then the meter may be presented to the desired attitude by releasing the quill screw handle 54 and rotating the cradle about the axis of its shaft 38 and relocking the quill. During service operations these adjustments may be changed several times and their convenient construction is very helpful.

I claim:

1. A repair rack for gas meters of the iron case type including in combination, a base for attachment to a bench or the like, an L-shaped frame having a horizontal and a hollow vertical member, vertical axis means pivoting the horizontal frame member to said base, an L-shaped cradle having a horizontal member for positioning over the corresponding frame member, and a vertical member, a shaft fixed in and projecting from the free end of said last mentioned vertical member parallel to a horizontal member, a horizontal sleeve secured in and extending through the upper end of the vertical member of the frame to journal the shaft, means housed in said vertical member to engage and lock the shaft, external operating means for said housed means, a resilient pad on the inner face of the cradle vertical member to engage a meter case resting on the horizontal member of the cradle, a second resilient pad movably mounted on one arm of a self-locking toggle to engage and clamp the meter, and means mounting said second pad for adjustment toward the cradle vertical member.

2. A repair rack for gas meters of the iron case type having a substantially horizontal cylindrical body comprising in combination, a cradle formed of horizontal and vertical channel members to L-shape, a pad on the vertical member positioned to engage the body of a meter resting on the horizontal member above its horizontal center, a horizontal shaft fixed to and extending from said vertical member at substantially pad height, a sleeve slidably mounted on said horizontal member, a clamp arm pivoted to said sleeve and having a meter engaging pad at its other end, self-locking means to actuate said arm and force the last mentioned pad toward the meter in a downwardly inclined direction, means substantially housed in the channel of said horizontal member adjustable to position said sleeve horizontally therealong, an L-shape frame having a vertical and a horizontal member, a base adapted to be secured to a bench or the like, means pivoting the free end of the frame horizontal member to said base for rotation about a vertical axis, a tube extending horizontally through the upper end of the frame vertical member providing a journal for said shaft and having an opening through the wall thereof, and means substantially housed in the frame end member adapted to project through said opening to clamp the shaft against rotation.

CHARLES D. PETERSON.

REFERENCES CITED

The following references are of record in the file of this patent:

UNITED STATES PATENTS

| Number | Name | Date |
|---|---|---|
| 1,220,507 | Flynn | Mar. 27, 1917 |
| 1,600,835 | Manley | Sept. 21, 1926 |
| 1,860,844 | Sorensen | May 31, 1932 |
| 2,011,926 | Birmingham | Aug. 20, 1935 |
| 2,054,572 | McKenna | Sept. 15, 1936 |
| 2,211,287 | Nevbig et al. | Aug. 13, 1940 |
| 2,269,946 | Lange | Jan. 13, 1942 |
| 2,322,380 | Mosley | June 22, 1943 |
| 2,350,034 | Herrington | May 30, 1944 |
| 2,390,428 | Disse | Dec. 4, 1945 |
| 2,392,549 | Rice | Jan. 8, 1946 |
| 2,431,589 | Shuler | Nov. 25, 1947 |
| 2,456,100 | Wood | Dec. 14, 1948 |
| 2,458,370 | Geddes | Jan. 4, 1949 |